Figure 1:
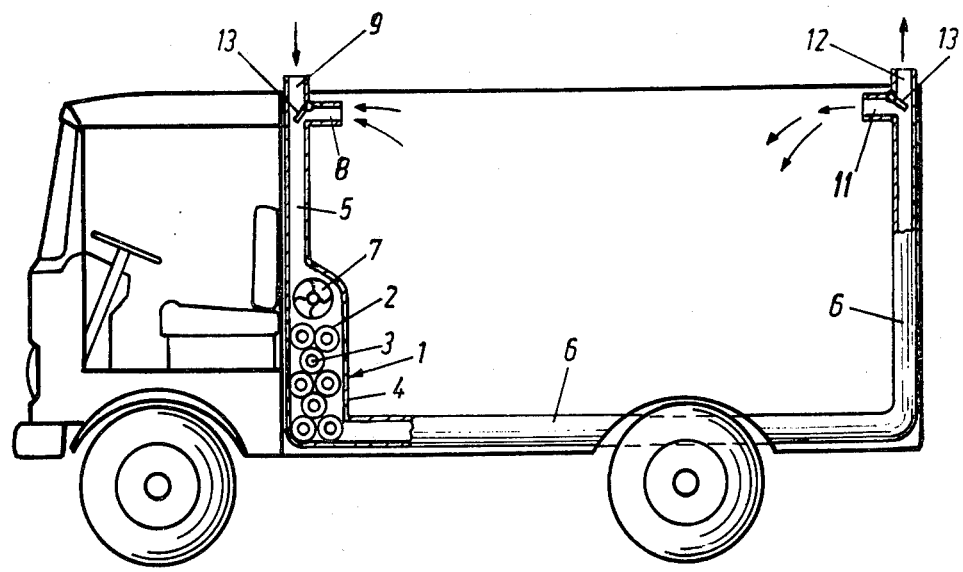

United States Patent [19]

Buchner et al.

[11] 4,179,896
[45] Dec. 25, 1979

[54] METHOD OF COOLING THE INTERIOR OF MOTOR VEHICLES (POWERED AT LEAST PARTLY BY HYDROGEN)

[75] Inventors: Helmut Buchner, Wendlingen; Helmut Saeufferer, Esslingen-Liebersbronn, both of Fed. Rep. of Germany

[73] Assignee: Daimler-Benz Aktiengesellschaft Stuttgart-Untertuerkheim, Fed. Rep. of Germany

[21] Appl. No.: 814,861

[22] Filed: Jul. 12, 1977

[30] Foreign Application Priority Data

Jul. 13, 1976 [DE] Fed. Rep. of Germany ....... 2631359

[51] Int. Cl.² .................. F25B 19/00; B60H 3/04; F25B 27/00
[52] U.S. Cl. .................................. 62/7; 62/243; 62/323
[58] Field of Search ............ 62/7, 50, 243, 323 A, 62/323 R

[56] References Cited

U.S. PATENT DOCUMENTS

| 2,181,851 | 11/1939 | Schlumbohm | 62/7 |
| 2,755,639 | 7/1956 | Straznicky | 62/7 |
| 3,363,425 | 1/1968 | Williamson | 62/7 |
| 3,378,063 | 4/1968 | Meffend | 62/7 |
| 3,524,734 | 8/1970 | Kamiryo et al. | 62/7 |
| 3,777,485 | 12/1973 | Emerson | 62/243 |
| 3,823,568 | 7/1974 | Bijasiewicz et al. | 62/7 |
| 3,857,245 | 12/1974 | Jones | 62/7 |

OTHER PUBLICATIONS

Automotive Hydride Tank Design–Donald B. Mackay Billings Energy Research Corp.–Provo, Utah pp. 160–162.
Prototype Hyd. Automobile Using a Metal Hydride–D.L. Henriksen et al.–Billings Energy Research Corp., Provo, Utah–pp. 1–11.

Primary Examiner—Lloyd L. King
Attorney, Agent, or Firm—Pennie & Edmonds

[57] ABSTRACT

A method and apparatus is disclosed for cooling the interior of a motor vehicle which motor vehicle is powered at least in part by hydrogen liberated from a hydride. Cooling of the interior such as the passenger compartment or cargo area is achieved by using the heat of the interior to supply at least part of the heat necessary for heating the hydride to liberate hydrogen. The apparatus includes, in combination with the interior of a vehicle a hydride container and heat transfer mechanism for transferring the heat of the interior to the hydride container thus cooling the interior.

10 Claims, 2 Drawing Figures

METHOD OF COOLING THE INTERIOR OF MOTOR VEHICLES (POWERED AT LEAST PARTLY BY HYDROGEN)

This invention relates to a method of and an apparatus for cooling the interiors, more especially the passenger compartment, of motor vehicles powered at least partly by hydrogen by removing heat from the air circulating in the interior.

Successful attempts have recently been made to make the exhaust gases of Otto cycle engines less polluting in their composition by the at least partial replacement of gasoline without any significant structural modifications having to be made to the engines for this purpose. One possibility is to power the engines at least partly with hydrogen gas ("Wasserstoff als Alternativkraftstoff fur Otto-Motoren" [Hydrogen as an Alternative Fuel for Otto Cycle Engines] by H. Buchner and H. Saufferer in ATZ 4/76 and "Prototype Hydrogen Automobile using a Metal Hydride" by D. L. Hendriksen, D. B. Mackay, V. R. Anderson—Billings Energy Research Corporation in Conference Proceedings of the 1st World Hydrogen Energy Conference, March, 1976/Miami 7c 1–12).

Thus, according to one proposal, the hydrogen tank used is a titanium-iron-hydride tank containing 200 kg of TiFe which is capable of holding approximately 50,000 liters of hydrogen bound in hydride form. Since heat is required for liberating hydrogen from the hydride, the tank is in the form of a heat exchanger which is fed with the cooling water of the engine and which is generally kept at around 60° C. According to another proposal, exhaust gases are used for heating the hydride tank.

The object of the present invention is to provide an air-conditioning installation or cooling installation for motor vehicles which saves energy by comparison with conventional air-conditioning installations and which is highly efficient in operation. It has now been found that the hydride tank or at least part thereof can even be operated at considerably lower temperatures than mentioned above and can be utilised for cooling the interiors of hydrogen-powered motor vehicles by using heat from the interior for liberating hydrogen from the hydride, thereby removing heat from the interior.

Accordingly, the invention is characterised in that hydrogen is liberated from a hydride through a heat-transferring connection wth the interior and in that the amount of heat (herein and in the claims referred to as $\Delta H$) required for liberation of the hydrogen is at least partly taken from the interior of the vehicle such as from the cargo area or passenger compartment. Since cooling to temperatures below 30° C. is generally required, the hydrogen is with advantage liberated at temperatures below 30° C. and preferably at temperatures which are at least about 15° C. below the temperature required in the interior.

By virtue of the invention, therefore, the cooling of passenger compartments, cold-storage compartments and the like does not involve any particular consumption of energy emanating from the effective power output of the engine, as is the case with conventional air-conditioning systems. Instead, the hydrogen liberated can be fully utilised for driving the engine without any loss of horsepower. The invention is suitable not only for motor vehicles powered solely by hydrogen, but also, and with advantage, for motor vehicles which are powered both by hydrogen and by another fuel, especially gasoline. In this case, the hydrogen is preferably used as fuel for idling, so that, for example even in traffic jams and in stop-start traffic conditions, hydrogen is uniformly consumed and, hence, the required cooling effect is obtained. At the same time, it is particularly advantageous that the exhaust is clean precisely when the engine is idling and in stop-start traffic conditions, so that an accumulation of poisonous exhaust gases can readily be avoided in this way.

Hydrides which are suitable both for reversible storage and also for cooling interiors are, in particular, hydrides of which the hydrogen dissociation pressure of approximately 1 bar, i.e. the minimum pressure to be delivered to the engine without a compressor, is adjusted at temperatures below the required cooling temperature, i.e. below 30° C., the $\Delta H$-value for liberating the hydrogen preferably amounting to more than 2 kcal/mole of $H_2$. The higher the $\Delta H$-value of the particular hydride and the lower the temperature at which the dissociation pressure of 1 bar is reached, the more intensively it is possible to cool with the particular hydride. As already mentioned, the temperature at which the hydrogen is liberated should best be at least 15° C. below the temperature to which the particular space is to be cooled.

Suitable hydride metals are TiFe, $LaNi_5$ and other alloys of rare earths with iron, cobalt and nickel, the properties of these hydride alloys lend themselves to modification in the desired manner by the use of dopants.

The apparatus according to the invention is characterised in that a hydride tank for supplying hydrogen acting as fuel is arranged at least partly in a heat-transferring connection with the interior of the motor vehicle. Since the hydrogen pressure in the hydride tank remains below 10 bars (in the case of TiFe) even in the event of heating to temperatures of 60° C., for example by the action of sunlight on the motor vehicle, the tank may be directly arranged in the space to be cooled without any need for special safety devices to prevent the tank from bursting. Ordinary metal tubes will withstand pressures equal to several times this elevated working pressure. However, it is also possible to arrange the tank outside the space to be cooled and to use the air of the space to be cooled directly or to use an intermediate carrier, for example water containing an antifreeze agent, for heat transfer.

Since it is not always cooling which is intended, the tank may be designed for connection to additional "heat sources", for example fresh air which may be preheated by the exhaust of heat of the engine, exhaust gas and/or cooling water. In this connection, fresh air has the great advantage that it may also be used for cooling the tank during filling of the tank during which it gives off heat.

Further features of the invention will become apparent from the following description of embodiments in conjunction with the accompanying drawings.

In the accompanying drawings:

FIG. 1 illustrates diagrammatically a cooling system for the cargo of a delivery van.

Figure 2:
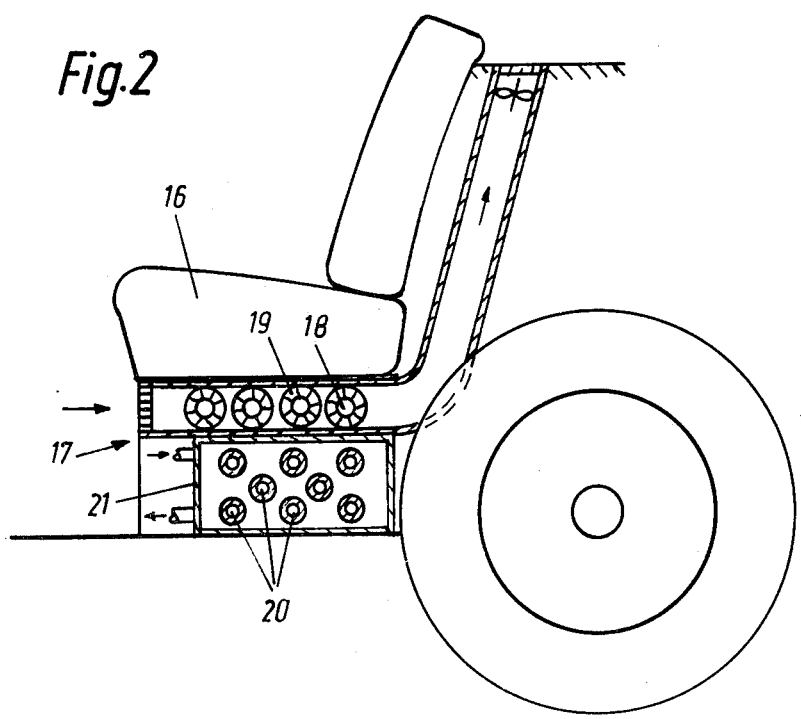

FIG. 2 diagrammatically illustrates a cooling system for the interior of an automobile of which only part has been shown.

In the embodiment of the invention illustrated in FIG. 1 of the accompanying drawings, a delivery van for perishable foods is fitted with an engine designed to be powered by gasoline and hydrogen. For this purpose a hydrogen tank 1 is arranged in the cold-storage compartment of the delivery van. The hydrogen tank 1 comprises parallel, intercommunicating steel tubes 3 which are provided with cooling ribs 2 and which are filled with titanium/iron mixed granulate with a grain size of less than 5 mm. The tubes 3 are disposed in a housing 4 which is provided with an air inlet duct 5 and an air discharge duct 6 and into which is built a fan 7, for example a cross-flow ventilator arranged parallel to the tubes 3. The air inlet duct 5 is branched, an intake branch 8 terminating in the cold-storage compartment for taking in recirculating air to be cooled and a fresh air branch 9 extending through the roof 10 of the delivery van for taking in fresh air. The discharge duct 6 also branches into a duct 11 opening into the cold storage compartment for blowing in cooled air and into a branch 12 leading directly into the open. Reversal valves 13 are provided in the branches for continuous alternation between pure recirculation and pure fresh air supply.

From the hydrogen tank 1, hydrogen pipes lead by way of suitable valves to a hydrogen filling spout and to a gas mixer of the engine which supplies the engine with a mixture of hydrogen and air which, in general, is gauged solely to keep the engine ticking over (these parts are not shown).

When the delivery van is stationary, the hydrogen tank 1 is at ambient temperature. If hydrogen is removed from it, the temperature prevailing in the tank falls depending upon the amount of hydrogen removed per unit of time in consequence of the amount of heat $\Delta H$ of 7.5 kcal/mole $H_2$ consumed for liberating the hydrogen from the TiFe hydride. Depending upon the amount of hydrogen removed and the heat input, the temperature in the tank can fall to at most $-20°$ C. to $-25°$ C., i.e. to the temperature at which the dissociation pressure of the TiFe-hydride has fallen to 1 bar. This amount of heat $\Delta H$ consumed during the liberation of hydrogen is delivered to the hydride tank completely or partly by means of the air stream which is circulated by the fan through the tank and the cold-storage compartment.

In order to guarantee the substantially uniform removal of heat from the cold-storage compartment, the hydrogen liberated is used as tick-over fuel for the delivery van, whilst gasoline is primarily used for propulsion. It is also possible however for the engine to be powered at least partly by hydrogen for propulsion purposes, for example in order to obtain an intensive initial cooling effect. The reversal may readily be obtained by means of valves controlled by pressure and/or temperature. This is readily possible because the hydrogen pressure inside the tank is largely a function of temperature providing the tank is still adequately filled with hydrogen. No kinetic problems arise because the rate at which hydrogen is liberated from the hydride is considerably higher than the rate at which the hydrogen is consumed.

Since during filling, i.e. during the reversible reformation of the hydride, the hydrogen tank is heated considerably beyond the ambient temperature, the tank 1 may be cooled by means of the fan 7, fresh air now being used as the cooling air and the heated air again being directly discharged into the open.

If it is not desired to cool the cold-storage compartment, for example in winter, the heat required may also be delivered to the tank 1 by fresh air or by air preheated by the motor or by the exhaust gas.

The hydrogen tank 1 may be additionally used for cooling the driver's cab. If it is desired to prevent the air in the cold-storage compartment from becoming mixed with the air in the driver's cab, the housing surrounding the tank may be divided and fitted with two fans. In this connection, it is even possible for individual zones of the tank to be kept at different temperature levels, depending on the intensity with which the individual compartments are to be cooled.

The cooling output of the hydride tank amounts to approximately 3 kW for a 100 horsepower engine turning over at idling speed. If the 100 horsepower engine in question is stepped up to partial load or to full load operation, the cooling output of the tank may be increased to 10 kW and 30 kW, respectively, which are fully available for cooling. The quantity of TiFe contained in the hydride tank amounts to 50 kg with a storage capacity for 1 kg of hydrogen. However, this quantity may also be kept larger or smaller, depending upon the required cooling output and cooling time, so that any conventional air-conditioning installation can be replaced.

In the embodiment of the invention illustrated in FIG. 2, an automobile, for example a taxi, is designed to run entirely on hydrogen. To this end, a hydride tank 17 filled with 200 kg of TiFe is provided under the lower seat 16, which is capable of holding 4 kg of $H_2$ corresponding to approximately 50,000 l of $H_2$. Since in this case the heat collected during cooling of the passenger compartment is generally not sufficient to liberate the amount of hydrogen required for full-load operation from the hydride, the hydride tank is divided. Only approximately one quarter of the tank capacity is used for cooling purposes. Individual tubes 18 are provided with cooling ribs 19 for heat-exchange with the air in the passenger compartment, and other tubes 20 are embedded in an externally heat-insulated water tank 21 which is fed with the cooling water of the engine.

In this embodiment, too, filling and removal pipes for hydrogen are provided at suitable points (not shown). In addition to pipes and a fan for the air to be cooled, inlet and outlet pipes for the cooling water of the engine are provided with the tank, more particularly with the water tank 21. The cooling water is circulated by means of the water pump and its rate of circulation can be regulated by means of corresponding valves.

Since the storage tubes 20 surrounded by the cooling water are kept at a relatively high temperature level, for example at 50° C., when the automobile is in use, the hydrogen pressure in these tubes is considerably higher than in the tubes 18 used for cooling purposes. Accordingly on the one hand, a pressure reducer is provided at the junction between the hydrogen pipes from the two tank sections 18 and 20 and the tank section 20 heated with cooling water in order to prevent pressure equalisation between the tank sections when the automobile is in use. On the other hand, this difference in hydrogen pressure may also be utilised for re-charging the storage tubes provided for cooling. This may be carried out in particular when cooling is no longer necessary, for example at the end of a journey. In this way, high cooling outputs can be demanded even of a small cooling tank without any danger of premature exhaustion.

It is also possible for that part of the tank surrounded by the cooling water to be charged with another reversible hydride, for example with magnesium/nickel hydride which, in terms of weight, is considerably more favourable than TiFe. Although in the case of magnesium/nickel hydride the dissociation pressure of 1 bar is only reached at relatively high temperatures (above 250° C.) by comparison with TiFe-hydride, this is not disadvantageous because the exhaust gas can in any case be kept at operating temperatures in the range from 500° to 600° C. and the TiFe-hydride is of course available for cold starting.

We claim:

1. A method of cooling the interior of a motor vehicle comprising operating the engine of said motor vehicle at least in part on hydrogen liberated from at least one hydride capable of liberating hydrogen upon being heated, said hydride being a hydride of which the $\Delta H$ value is greater than 2 kcal/mole $H_2$ and of which the hydrogen dissociation pressure of 1 bar occurs at temperatures of from $+30°$ to $-25°$ C., supplying heat to said hydride to liberate the hydrogen and obtaining the heat so supplied to the hydride at least in part from the air circulating in the interior of the vehicle.

2. A process as claimed in claim 1 in which the hydrogen is liberated at a temperature of at least 15° C. below the temperature required in the interior.

3. A method as claimed in claim 2 in which the hydride used is a hydride of which the hydrogen dissociation pressure of 1 bar occurs at temperatures below $+20°$ C.

4. A method as claimed in claim 2 in which the hydride used is a hydride of which the hydrogen dissociation pressure of 1 bar occurs at temperatures below 0° C.

5. A method as claimed in claim 1 in which a hydride with a $\Delta H$ value above about 7 kcal/mole $H_2$ is used.

6. A method as claimed in claim 5 in which a hydride with a $\Delta H$ value above 10 kcal/mole $H_2$ is used.

7. A method as claimed in claim 5 in which the hydrogen is used for engines in which another fuel is used in addition to hydrogen.

8. A method as claimed in claim 1 in which the hydride is a hydride of the base alloy TiFe or alloy thereof which hydride has a $\Delta H$ value of 7.5 kcal/mole $H_2$ and has been modified by the introduction of a dopant.

9. A method as claimed in claim 1 in which the hydride is a hydride of a base alloy of the formula $AB_5$ or an an alloy thereof, in which A is a rare earth metal and B represents iron, cobalt or nickel, and in which the hydride has been modified by the introduction of a dopant.

10. A method as claimed in claim 9 in which the hydride is a hydride of $LaNi_5$.

* * * * *